United States Patent [19]

Westby

[11] Patent Number: 5,802,080

[45] Date of Patent: Sep. 1, 1998

[54] CRC CHECKING USING A CRC GENERATOR IN A MULTI-PORT DESIGN

[75] Inventor: Judy Lynn Westby, Bloomington, Minn.

[73] Assignee: Seagate Technology, Inc., Scotts Valley, Calif.

[21] Appl. No.: 623,508

[22] Filed: Mar. 28, 1996

[51] Int. Cl.[6] .......................... G06F 11/10; H03M 13/00
[52] U.S. Cl. ...................... 371/53; 371/48; 371/20.1; 371/37.7; 371/37.01
[58] Field of Search ........................ 371/53, 54, 48, 371/37.01, 37.7, 20.1, 67.1, 37.6, 71

[56] References Cited

U.S. PATENT DOCUMENTS

| | | | |
|---|---|---|---|
| 4,486,739 | 12/1984 | Franaszek et al. | 340/347 |
| 5,459,850 | 10/1995 | Clay et al. | 395/497.02 |
| 5,517,508 | 5/1996 | Scott | 371/37.01 |

*Primary Examiner*—Phung M. Chung
*Attorney, Agent, or Firm*—Kinney & Lange, P.A.

[57] ABSTRACT

A module for connection to a computer network has a plurality of ports for exchanging data with the network. First and second buffers store data received through separate ones of the ports, the first buffer also stores data to be transmitted through all of the ports. An error (CRC) checker is responsive to a CRC code associated with data received by one of the ports to verify the integrity of the associated data. A CRC generator generates a CRC code for data to be transmitted through one of the ports. A gate is connected between the CRC generator and the buffers to transfer to-be-transmitted data stored in the first buffer to the CRC generator and to transfer received data stored in the second buffer to the CRC generator. A comparator is connected to the CRC generator and to the second buffer and is responsive to the CRC code generated by the CRC generator and the CRC code stored in the second buffer to verify the integrity of received data stored in the second buffer.

11 Claims, 4 Drawing Sheets

CRC CHECKING USING A CRC GENERATOR IN A MULTI-PORT DESIGN

BACKGROUND OF THE INVENTION

This invention relates to error checking in multi-port designs, and particularly to the use of a Cyclic Redundancy Check (CRC) generator as a CRC checker to verify received CRC information.

Most data transmission operations employ error checking by which an error code, based on a digital word of the transmission, is checked to verify the integrity of the received digital word. One such error checking employs CRC information. A typical module employing CRC error checking will include a CRC checker to verify the integrity of received data words and a CRC generator to generate CRC information for digital words being transmitted. In multi-port designs, a CRC checker and a CRC generator must be available for each port to handle verification of each received digital word and to generate CRC information for each digital word being transmitted. In many applications, the module only transmits on one port at a time. For example, a disc drive subsystem communicating through a multi-port module to a computer network would prepare and transmit data though only a single port at any given time. However, the module might attempt to receive data through plural ports at a given time.

One approach to reception of data through plural ports is to simply inhibit reception of data through ports when one port is already receiving data. This approach shares the CRC checker amongst the several ports. The first port to receive data seizes use of the CRC checker to the exclusion of the other ports, and the other ports are inhibited from receiving data. Hence, incoming data cannot be received on the other ports End the other ports are limited to the function of data transmission. This approach resulted in the other ports receiving a busy condition in response to requests to transmit data and necessitated repeating the sequence to request transmission of data.

A modification of this first prior art approach is to permit reception of the data through the second port, but to buffer (store) the data until the CRC checker is free to verify the data integrity. This modification was not altogether practical because if the first port again requires use of the CRC checker while data from the second port was allowed through the CRC checker, it became necessary to buffer data from the first port until the CRC checker was again free. Alternatively, the first port would need to generate a busy condition until the CRC checker was released by the second port.

Another approach is to duplicate the CRC checker for each port so that each port may receive data at the same time as each other port and may verify the integrity of received data using its dedicated CRC checker. While this latter approach is superior to the former approach by permitting reception and verification of data by all ports at the same time, it does so at the expense of additional gate logic and hardware, which is costly in terms of price as well as the space occupied. Moreover, in multi-port, half duplex systems employing checkers for all ports, if all of the ports are receiving data, the generator is inactive. It was often the case to employ separate generators where separate checkers were employed for each port, primarily to reduce multiplexing. In such systems, if a given port's checker was active, its generator was inactive, and vice versa. Therefore, not only does the duplication of checkers and generators offer a costly solution to the problem of a single shared checker, it is a wasteful solution that does not fully utilize the capability of the hardware.

In plural loop networks, it is necessary to "initialize" a loop after an error correction, as well as when a module is connected into the channel, or when the channel is powered up. Initialization is ordinarily accomplished by transmitting loop initialization data onto the loop. However, if a module connected to the loop is already receiving data through a port connected to another loop, that module might not be able to receive the loop initialization data. Consequently, a busy condition is provided on the loop, requiring the loop initialization sequence to be re-attempted at a later time. Moreover, if the modules can receive only on one loop at a time, the modules cannot receive user data through another port while loop initialization is occurring on one channel.

Fibre links have received considerable attention in connection with transmission of data between various modules of a computer network. More particularly, fibre channels offer significant advantages over Small Computer Standard Interface (SCSI) buses in terms of higher bandwidth, greater connectability, ease of attachment of modules, transmission distance, and other factors. For example, a typical SCSI bus is able to handle up to 15 modules with a total distance of up to about 25 meters, whereas a fibre channel can handle up to 126 modules with a distance of about 30 meters between modules and up to 10 kilometers using optical transmission. Thus, the TerraByte standard required up to 70 SCSI buses but only about 10 fibre channels. Hence, with an increase in the number of modules on a fibre channel over those on a SCSI bus, the likelihood that a conflict will arise during loop initialization is greatly increased. It is important that a channel be brought up to operation as early a possible to reduce the load of data traffic that would otherwise be imposed on other channels. There is, therefore, a need for an arrangement to permit multi-port modules to receive data on plural channels simultaneously without significantly increasing the number of gates and other hardware. More particularly, there is a need for an arrangement of checker(s) and generator(s) that permits the checker(s) to be shared amongst the ports of a multi-port system, yet makes error checking available to all ports at the same time.

SUMMARY OF THE INVENTION

The present invention is directed to a multi-port system by which an error code generator is employed with a comparator to act as an error checker. Frames, or packets of data, may be received on several ports at the same time. If data are received when no other port is already receiving data, the error code in the received data is checked with the error checker to verify the integrity of the received data, as in the prior art. However, if another port is receiving data and is using the error checker, an error code is generated by the error code generator based on the second-received data. The generated error code is compared to the error code in the second-received data to verify the integrity of the second-received data. Thus, the framing logic is shared between the ports to reduce gate count, and the error code generator, normally idle during periods of data reception, is utilized to check the error codes received by one of the ports.

More particularly, one form of the invention comprises a module for connection to a computer network in which the module has a plurality of ports for exchanging data with the network. The module has first and second buffers for storing data received through separate ones of the ports, the first buffer also for storing data to be transmitted through all of the ports. An error checker is responsive to an error code associated with data received by one of the ports to verify the integrity of the associated data. An error code generator generates an error code for data to be transmitted through one of the ports. An input control is connected between the error code generator and the first and second buffers to transfer to-be-transmitted data to the error code generator that is stored in the first buffer and to transfer received data to the error code generator that is stored in the second buffer. A comparator is connected to the error code generator and to the second buffer and is responsive to the error code generated by the error code generator and the error code stored in the second buffer to verify the integrity of received data stored in the second buffer.

In accordance with one feature of the invention, the error code is CRC information, the error checker is a CRC checker and the error code generator is a CRC generator.

In accordance with another feature of the invention, a priority is established that establishes loop initialization data as being checked using the error code generator and comparator, rather than the error checker, if no other port is receiving data.

In another form of the invention, a process is provided to verify the integrity of data received on a plurality of ports. Data received on a first of the ports are stored in the first buffer, and data received on a second of the ports are stored in the second buffer. The integrity of received data stored in the first buffer is verified using the error checker. The integrity of received data stored in the second buffer is verified by generating an error code based on the data stored in the second buffer and comparing the generated error code to the error code stored in the second buffer.

In accordance with one feature of this second form of the invention, loop initialization data is stored in the second buffer so that its integrity is verified by generating an error code based on the loop initialization data and the generated error code is compared to the received error code.

DETAILED DESCRIPTION OF THE PREFERRED EMBODIMENT

Fibre links have received considerable attention in connection with transmission of data between various modules of a computer network. It is desirable in fibre transmission to employ DC balanced run length limited codes. One such code is an 8-bit/10-bit (8B/10B) code described by Franaszek et al. in U.S. Pat. No. 4,486,739, granted Dec. 4, 1984, and incorporated herein by reference. More particularly, Franaszek et al. described a DC balanced (0,4) 8B/10B run length limited code having a maximum run length of 4, a coding efficiency of 0.8066 bits per baud, a maximum disparity of 6, and a running disparity at block boundaries of ±1. One feature of the 8B/10B code is that error checking can be easily accomplished through the use of a Cyclic Redundancy Check (CRC). More particularly, the CRC used with the 8B/10B code can detect at least any combination of double errors in the line digits, as well as a single error burst of a length that does not exceed the number of check bits.

The Franaszek 8B/10B encoder is capable of handling only 8-bit words. However, techniques have been developed to place a pair of Franaszek-type encoders in parallel to handle 16-bit words. One such technique is found in my patent application entitled "16B/20B Encoder", application Ser. No. 08/623,400, filed on even date herewith which issued as U.S. Pat. No. 5,663,724, granted Sep. 2, 1997, and incorporated herein by reference. Using a pair of parallel 8B/10B encoders, it is possible to provide network ports for modules capable of handling 16-bit words.

Figure 1:
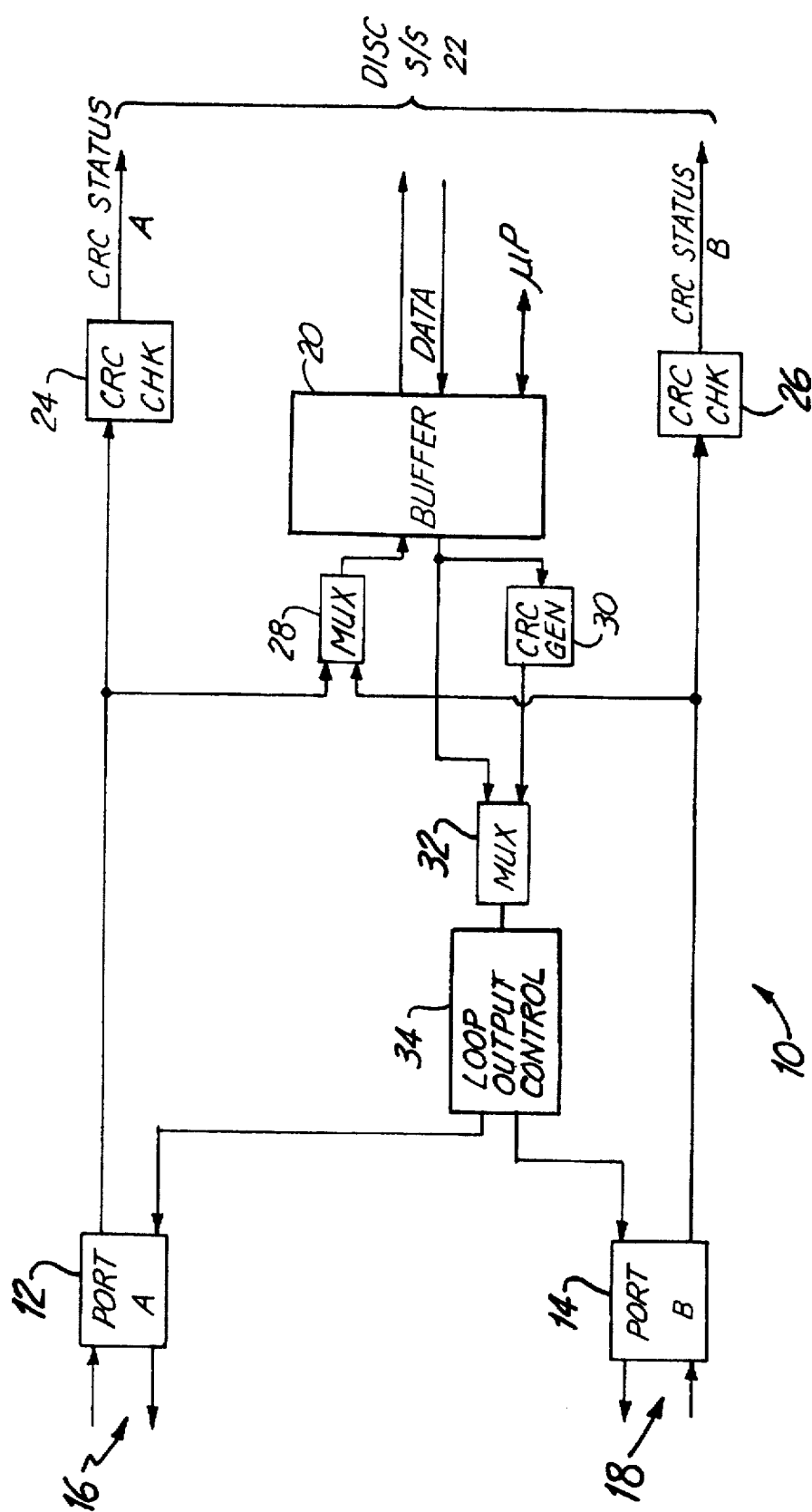
FIG. 1 is a block diagram of a typical dual port CRC checking and generation system.

FIG. 1 illustrates a typical dual port module 10 using CRC checking and generation. More particularly, the system comprises a pair of ports 12 and 14, connected on one side 16,18 to fibre channels, and on the opposite side through buffer 20 to a disc subsystem (not shown) and subsystem microprocessor (not shown) through channels 22. The receive output of each port 12,14 is provided through multiplexer 28 to buffer 20. The receive output of each port is also connected through CRC checker 24,26 to disc subsystem 22 to indicate the CRC status of data received on the respective channel 16,18 and stored in buffer 20. Thus, each port provides received data through multiplexer 28 and buffer 20 to the disc subsystem, and the integrity of that data is verified by CRC checker 24,26.

Data to be transmitted by module 10 are received from the subsystem by buffer 20. CRC generator 30 generates CRC information which is multiplexed with the data by multiplexer 32 and is routed by loop output control 34 to the respective port 12 or 14 for output on the respective fibre channel 16, 18. As illustrated in FIG. 1, a separate CRC checker 24,26 is employed for each port if data are to be received on each port at the same time. In other forms of prior modules, a single CRC checker may be switched between the ports to verify the integrity of received data received by a receiving port. However, systems employing a single CRC checker require that one or the other of the ports be idle, or be transmitting, which is not altogether practical.

The present invention is directed to a technique by which a single CRC checker is employed in a multi-port system, permitting both ports to receive simultaneously. The apparatus according to the present invention is broadly illustrated in FIG. 2 in which ports 12,14 receive and transmit data between respective fibre channels 16 and 18 and framing logic 40. Framing logic 40 includes receive framing logic 42, transmit framing logic 44 and an on-chip buffer 46 and on-chip buffer control 48. Receive framing logic 42 includes port multiplexer 28 connected to receive data from ports 12 and 14 and provide data output to both main buffer 20 and start-of-frame detector 48. CRC checker 24 receives framing information from detector 48 and data from multiplexer 28 to check the CRC information in the data and provide a CRC check signal to frame validator 50. Frame validator 50 provides a CRC status signal through buffer control 52 to main buffer 20. The CRC status signal provided by checker 24 identifies the error status of that data received through one of ports 12 and 14 and processed through multiplexer 28.

Transmit framing logic 44 includes an input control gate 54 connected to receive data from buffer 20 or on-chip buffer 46. CRC generator 30 receives the data from control gate 54 and generates CRC information based on the data word. Multiplexer 32 multiplexs the data from control gate 54 and CRC information from generator 30 and provides digital words containing CRC information to loop output control 34. Loop output control 34 provides the words to the output channel of the selected port 12 or 14 for transmission.

The subsystem microprocessor (not shown) is connected to on-chip buffer 46 and to input control 54 to control operation of buffer 46 and control 54. In the receive mode, loop initialization data is received by buffer 46 and forwarded through control 54 to CRC generator 30. The operation of input control gate 54 is controlled by the microprocessor firmware which determines when to allow loop initialization data to be forwarded to CRC generator 30. Loop initialization data are also forwarded from buffer 46 to the microprocessor together with the CRC status from comparator 56 to indicate the validity of the data. The CRC information generated by generator 30 is forwarded to comparator 56 in receive framing logic 42 where it is compared to CRC information in the loop initialization data. The output of comparator 56 provides CRC status information concerning the loop initialization data processed through buffer 46.

Figure 2:
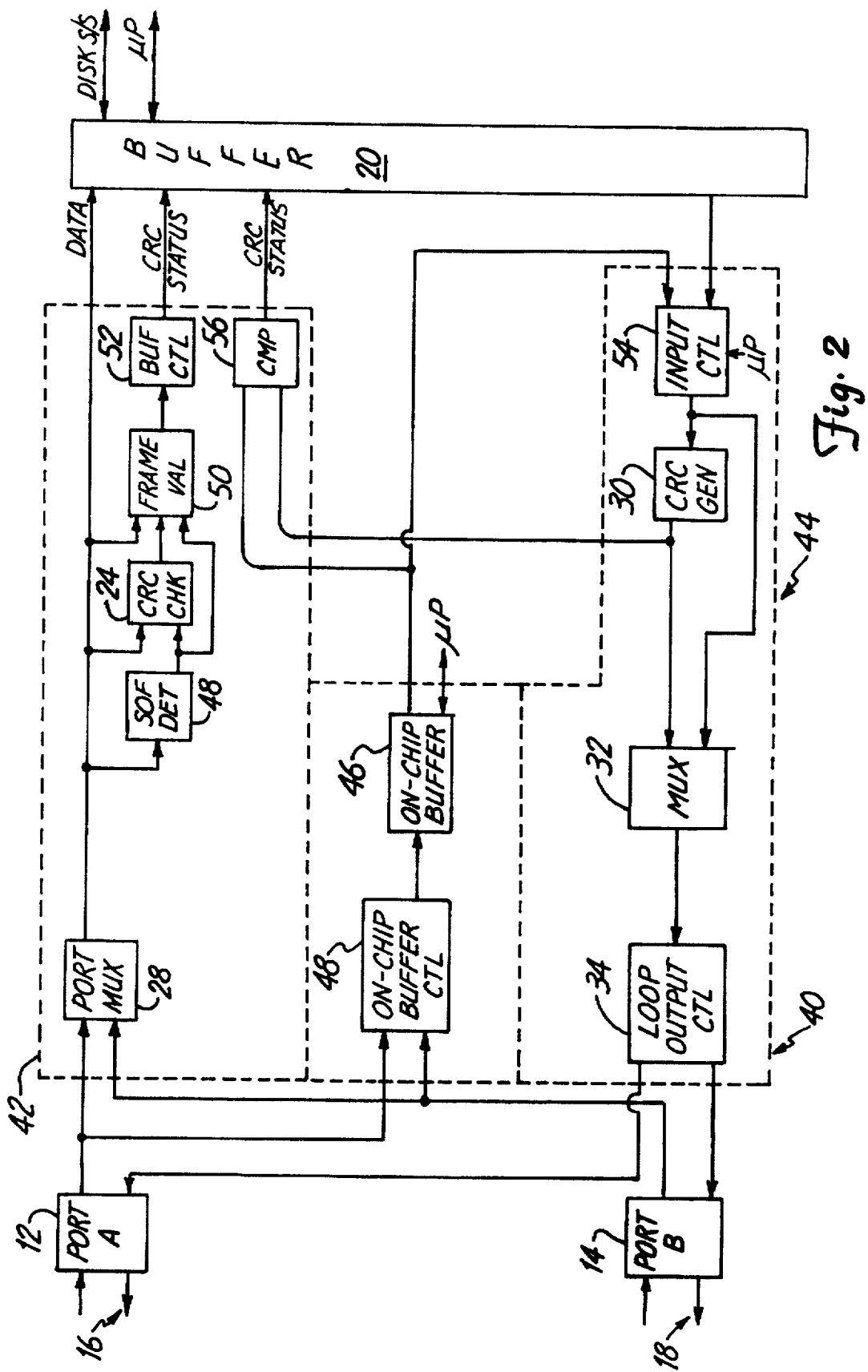
FIG. 2 is a block diagram illustrating a CRC checking and generation for a dual port design in accordance with the presently preferred embodiment of the present invention.
Figure 3:
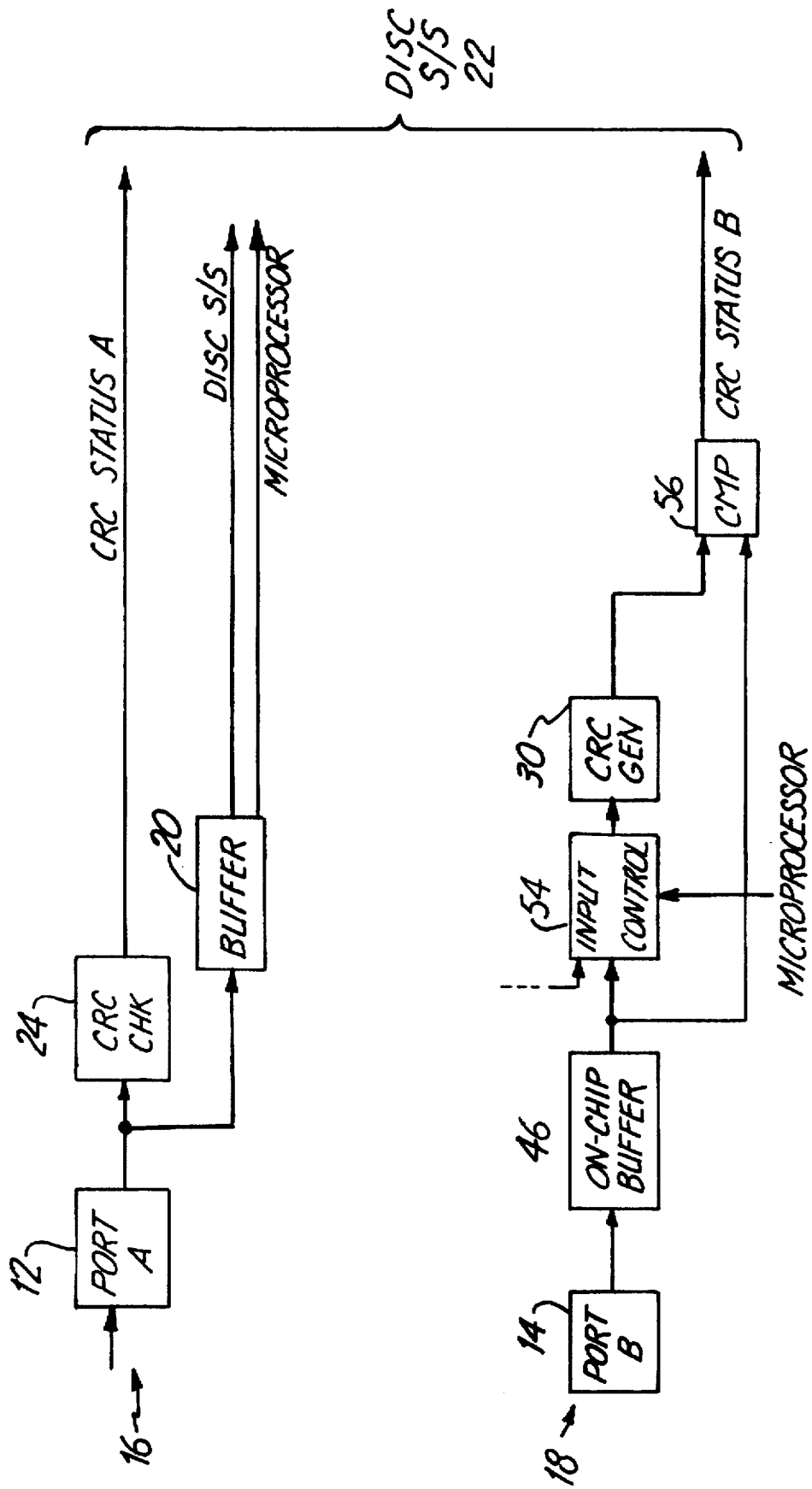
FIG. 3 is a diagram of the apparatus shown in FIG. 2 in the configuration of CRC checking.

FIG. 3 is a simplified configuration of The apparatus illustrated in FIG. 2 illustrating a receive mode. In the present design, framing logic 40 (FIG. 2) is shared by both ports to thereby reduce gate count. Hence, frames (packets of data) may be received on either port 12 or 14. In a preferred form of the invention, the first port receiving loop initialization data accesses the on-chip buffer 46, rather than the main buffer 20. Hence, framing logic 40 (FIG. 2) includes on-chip buffer control 48 that detects a port is in a loop initialization state and reserves on-chip buffer 46 for that port, if it is not already in use. Logic in on-chip buffer control 48 detects the start-of-frame delimiters and captures the data in on-chip buffer 46, rather than buffer 20. This arrangement leaves CRC checker 24 free for the alternate port.

If port A (12) receives user data, it seizes use of CRC checker 24. Received data includes error code, which in the present case is CRC information concerning the data words to which the CRC information is attached. The operation of port 12, checker 24 and buffer 20 is as in the prior systems with received data being stored in buffer 20 and the integrity established by CRC checker 24 checking the received CRC information to generate status information identifying the integrity of the data. The received data and the status information concerning that data are forwarded to disc subsystem 22 through buffer 20. Additionally, although the apparatus is described in connection with port A seizing use of checker 24, multiplexer 28 is established so that either port 12 or 14 may seize checker 24, thereby possibly reversing the roles of the ports, depending on the timing and type of received data.

Independently of port A (12) receiving data, if port B (14) begins receiving loop initialization data (which also includes CRC information), data received on port 14 are processed through control 48 for storage in on-chip buffer 46. Input control 54 is responsive to firmware from the microprocessor to forward data from buffer 46 to CRC generator 30. CRC generator 30 generates CRC information based on the received data in buffer 46. The CRC information generated by CRC generator 30 is compared to the CRC information in buffer 46 by comparator 56. If the CRC information generated by generator 30 matches CRC information in buffer 46, a CRC status information of "OK" is generated to indicate the data are correctly received. If comparator 56 fails to identify a match between the CRC information generated by generator 30 and the CRC information in buffer 46, CRC status information is generated to indicate that the data was not correctly received. The data from on-chip buffer 46 are provided to the microprocessor (not shown) to operate the firmware there.

When a frame is passed through CHIC generator 30, CRC identification is calculated. In the receive mode, the generated CRC information is compared to the CRC identification in the original data by comparator 56 to verify that the frame was successfully received. If the frame was successfully received, comparator 56 provides a status output indicating successful reception of the frame to disc subsystem 22. On the other hand, if comparator 56 does not indicate a comparison of the generated CRC identification by CRC generator 30 and the CRC identification in the data, comparator 56 provides information to disc subsystem 22 that the frame was not successfully received.

In FIG. 3 it is presumed that port B is the first to reach a state of reception of loop initialization data and thus seizes use of on-chip buffer 46. Thus, data received on port 14 is stored in on-chip buffer 46. In a preferred form of the invention, if a port is the first and only port to become activated on a loop, the loop initialization procedure requires that port be prepared to receive the frame that it transmits. A conflict could arise due to the received loop initialization data attempting to seize CRC generator 30 if the CRC generator is still occupied with transmission of data. To resolve this conflict, input control 54, which is under control of microprocessor firmware, inhibits forwarding received loop initialization data in buffer 46 to CRC generator 54 if the microprocessor recognizes that data frames are still being transmitted. In this case, the received frame is held in buffer 46 and forwarded to CRC generator 30 when the firmware determines no frames are being transmitted.

Figure 4:
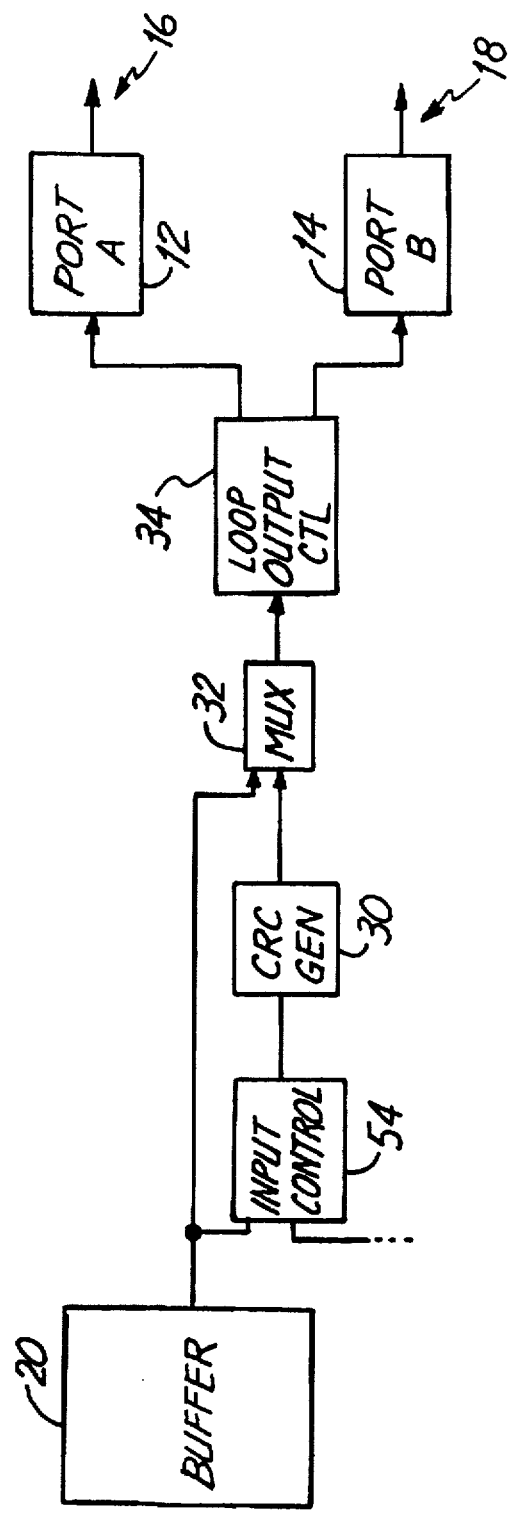
FIG. 4 is a diagram of the apparatus shown in FIG. 2 in the configuration of CRC generation.

As shown in FIG. 2, input control 54 is connected to buffers 20 and 46 and controlled by firmware in the microprocessor to process data from one or the other buffer. In the case of reception, shown in FIG. 3, control 54 forwards loop initialization data to CRC generator 30 for comparison by comparator 56. FIG. 4 illustrates the configuration of the apparatus of FIG. 2 when operating to transmit data from the disc subsystem, and more particularly from buffer 20 onto one of fibre channels 16 and 18. She data to be transmitted is initially stored in buffer 20 and is routed through control 54 to CRC generator 30. CRC generator 30 generates CRC information based on the data, which is multiplexed with the data in buffer 20 by multiplexer 32 and routed to a selected output port 12 or 14 by loop output control 34 as described in connection with FIG. 1.

It is evident that if a port is transmitting data using transmit framing logic 44 (including CRC generator 30), the other port may simultaneously receive data through receive framing logic 42.

The present invention thus provides for the reception of data on both ports of a dual port system using a single CRC checker, and employing the CRC generator and a comparator as a CRC checker for the other channel. More particularly, the present invention permits reception of loop initialization data by a module regardless of the status of the other ports of the module sending or receiving data. Hence, the present invention allows for plural ports to receive data at the same time without requiring duplicate CRC checkers as in prior multi-port systems. The present invention may be expanded to multi-port devices in which multiple CRC checkers and generators are employed to reduce the overall gate count of the design.

Although the present invention has been described with reference to preferred embodiments, workers skilled in the art Frill recognize that changes maybe made in form and detail without departing from the spirit and scope of the invention

What is claimed is:

1. In a module for connection to a computer network and having a plurality of ports for exchanging data with the network, received data including an error code, the module having first and second buffers for storing data, an error checker responsive to the error code associated with data received by one of the ports to verify the integrity of the associated data, and an error code generator for generating an error code for data to be transmitted through one of the ports, the first and second buffers storing data received through separate ones of the ports, the first buffer storing data to be transmitted through all of the ports, the improvement comprising:

a gate having a first input connected to the first buffer and a second input connected to the second buffer and an output connected to the error code generator, the gate being responsive to the first buffer to transfer data to be transmitted to the error code generator and being responsive to the second buffer to transfer received data in the second buffer to the error code generator; and a comparator connected to the error code generator and to the second buffer and responsive to the error code generated by the error code generator and error code stored in the second buffer to verify the integrity of received data stored in the second buffer.

2. In the module of claim 1, wherein the error code is CRC information, the error checker is a CRC checker and the error code generator is a CRC generator.

3. In a module for connection to a computer network and having a plurality of ports for exchanging data with the network, the module including an error code generator for generating an error code associated with data to be transmitted, the received data including an error code, the module having first and second buffers for storing data received through separate ones of the ports and an error checker to verify the integrity of data received by one of the ports, the process of verifying the integrity of data received on a plurality of ports comprising:

storing data received on a first of the ports in the first buffer, and storing data received on a second of the ports in the second buffer; and verifying the integrity of received data stored in the first buffer using the error checker, and verifying the integrity of received data stored in the second buffer using the error code generator, by:

operating the error code generator to generate an error code based on the received data stored in the second buffer, and comparing the generated error code to the error code stored in the second buffer.

4. The process of claim 3, wherein data received by the first and second ports overlap in time, and the data received by one of the ports includes loop initialization data, the module causing the loop initialization data to be stored in the second buffer.

5. The process of claim 3, wherein the plurality of ports are arranged to transmit data to the network, the first buffer being arranged to store data to be transmitted to the network, the error code generator generating an error code for data stored in the first buffer to be transmitted by one of the ports, the process further comprising:

connecting the error code generator to a selected one of the first and second buffers to selectively generate an error code based on data in the first buffer to be transmitted and an error code based on the received data stored in the second buffer.

6. The process of claim 5, wherein the error code generated by the error code generator is selectively combined with data in the first buffer for transmission through a port or is compared to an error code stored in the second buffer, the selection being based on the connection of the error code generator to one of the first and second buffers.

7. The process of claim 5, wherein the error code is CRC information, the error checker is a CRC checker and the error code generator is a CRC generator.

8. The process of claim 3, wherein the error code is CRC information and the error checker is a CRC checker.

9. In a module for connection to a computer network and having a plurality of ports for exchanging data with the network, the module including an error code generator for generating an error code associated with data to be transmitted, the received data including an error code, the module having first and second buffers for storing data received through separate ones of the ports and an error checker to verify the integrity of data received by one of the ports and stored in the first buffer, the process of verifying the integrity of data received by another one of the ports and stored in the second buffer comprising:

operating the error code generator to generate an error code based on the received data stored in the second buffer, and comparing the generated error code to the error code stored in the second buffer.

10. The process of claim 9, wherein the error code is selectively combined with data in the first buffer for transmission through a port or is compared to an error code stored in the second buffer.

11. The process of claim 9, wherein the error code is CRC information.

* * * * *

UNITED STATES PATENT AND TRADEMARK OFFICE
CERTIFICATE OF CORRECTION

PATENT NO. : 5,802,080
DATED : SEPTEMBER 1, 1998
INVENTOR(S) : JUDY LYNN WESTBY

It is certified that error appears in the above-identified patent and that said Letters Patent is hereby corrected as shown below:

Col. 1, Line 33, delete "End", insert --and--

Col. 5, Line 18, delete "of The", insert --of the--

Col. 6, Line 1, delete "CHIC", insert --CRC--

Col. 6, Line 26, delete "arc", insert --are--

Col. 6, Line 38, delete "She", insert --The--

Col. 6, Line 60, delete "("

Col. 6, Line 65, delete "Frill", insert --will--

Signed and Sealed this

Thirteenth Day of July, 1999

Attest:

Attesting Officer

Q. TODD DICKINSON

Acting Commissioner of Patents and Trademarks